Dec. 22, 1936.  H. L. ADAMS  2,065,414
RETRACTABLE LANDING GEAR
Filed July 30, 1932  4 Sheets-Sheet 1

Inventor
H. L. Adams

Dec. 22, 1936.  H. L. ADAMS  2,065,414
RETRACTABLE LANDING GEAR
Filed July 30, 1932   4 Sheets-Sheet 2
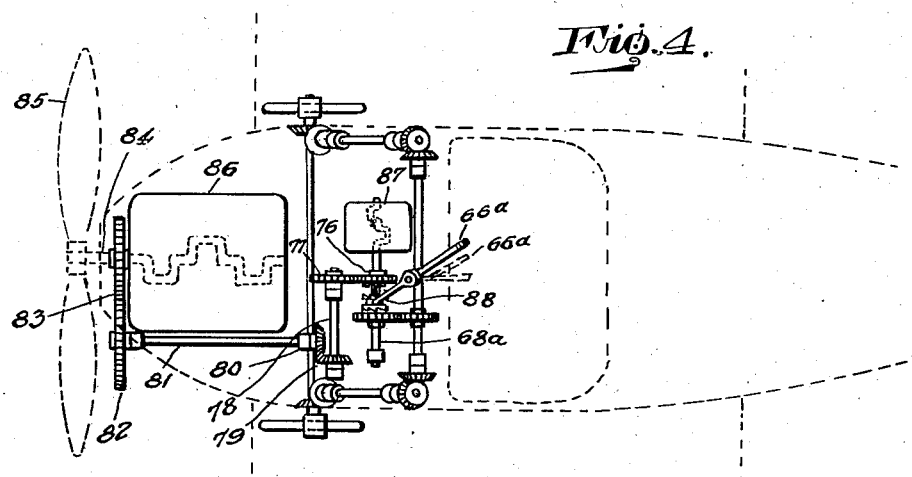
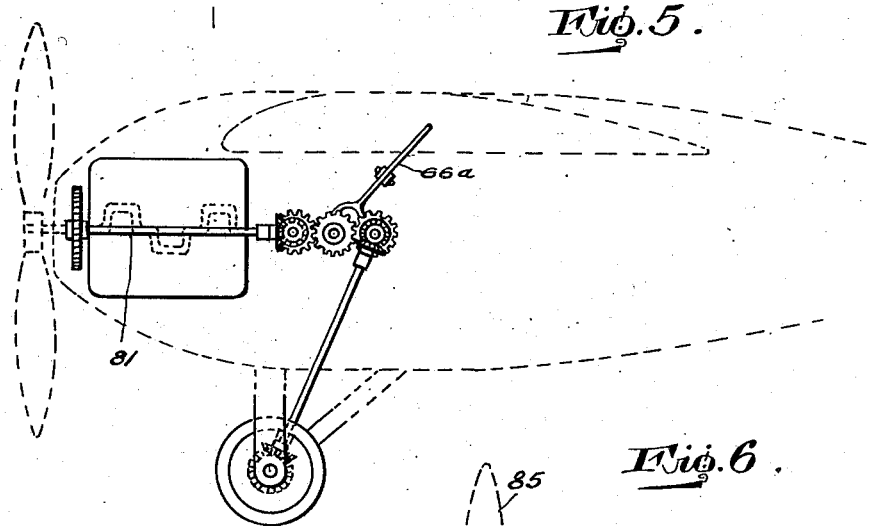
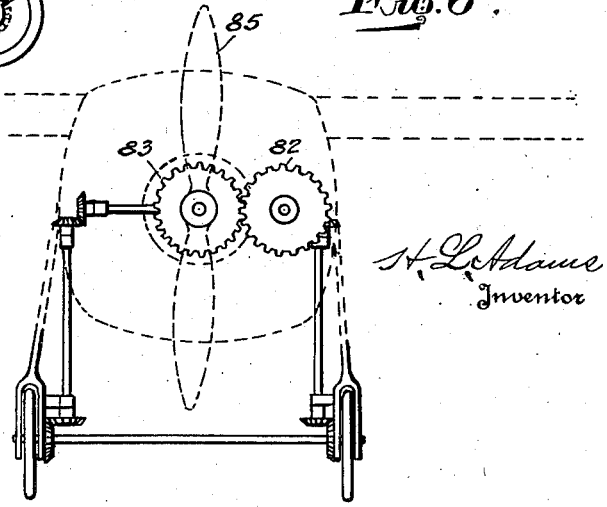

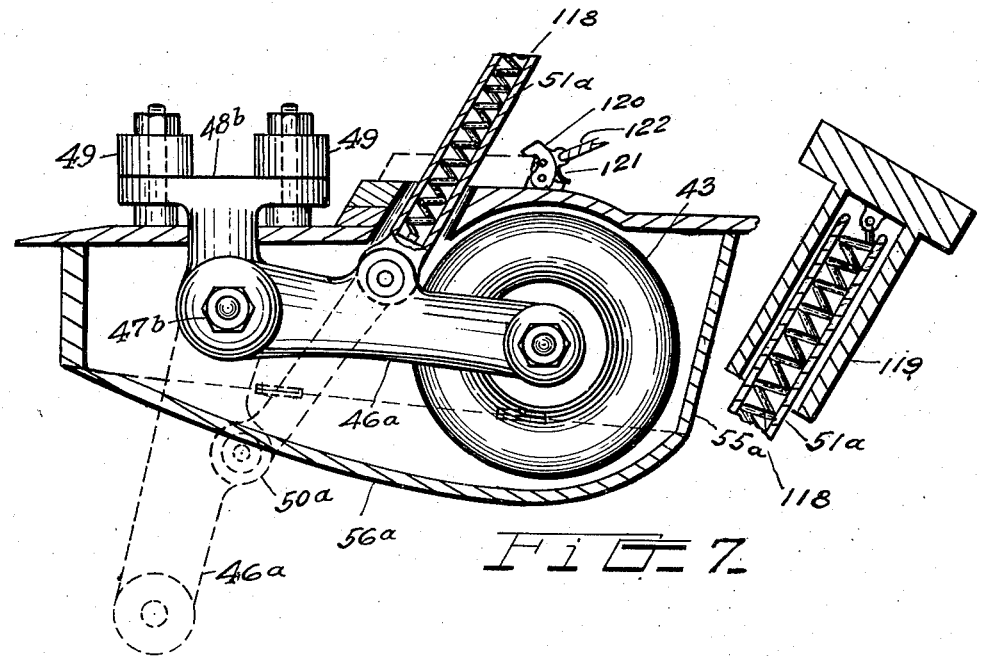
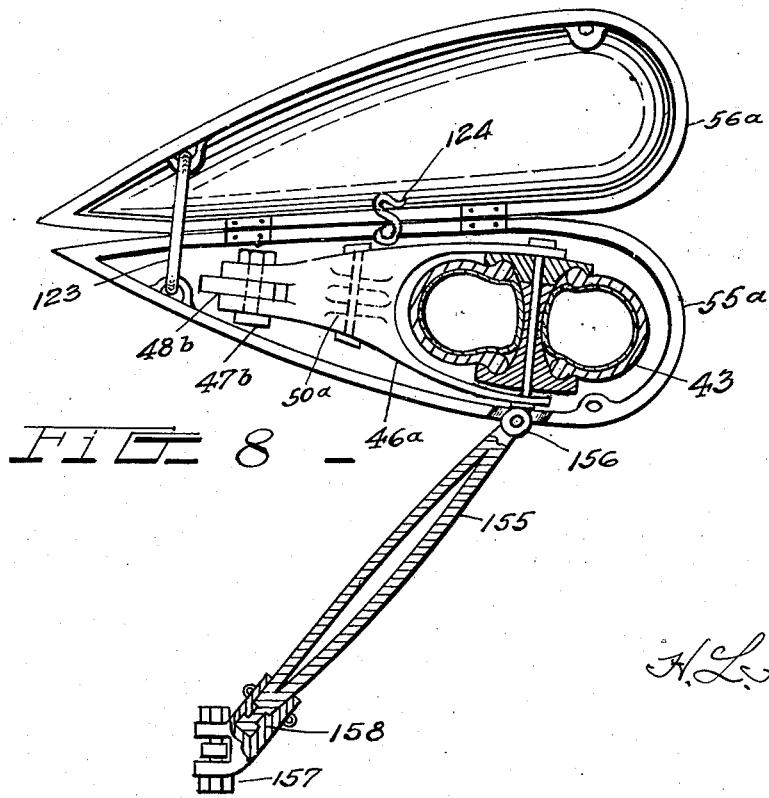

Dec. 22, 1936.   H. L. ADAMS   2,065,414
RETRACTABLE LANDING GEAR
Filed July 30, 1932   4 Sheets-Sheet 4

Inventor
H. L. Adams
By
Attorney

Patented Dec. 22, 1936

2,065,414

UNITED STATES PATENT OFFICE 2,065,414

RETRACTABLE LANDING GEAR

Herbert Luther Adams, Washington, D. C.

Application July 30, 1932, Serial No. 627,089

7 Claims. (Cl. 244—50)

This application is a continuation in part of my prior application Serial No. 461,412, filed April 14, 1921, and since maturing into Patent No. 1,888,418.

My invention primarily relates to that class of flying machines, which are heavier than air but certain details may be used on any flying machine, aircraft, or other uses.

An object of the invention is to provide a landing gear that may be quickly and easily folded from a normal ground contact position to a position wherein all parts lie closely adjacent the fuselage with the ground wheels closed against the front end of the fuselage.

Another object is to provide a landing gear which is comprised of a minimum number of parts, although having a maximum strength, and which is hereby economical to manufacture.

A further object is to reduce the head resistance usually offered to forward travel of airplanes to which end I provide a novel form of stream line air shield associated with the landing and take-off gear.

A further object is to provide a landing gear which is supported by the aircraft framing and wherein the main support bars of the gear are adjustable for varying the spacing therebetween. It is important in the design of a retractable landing gear to provide a structure that is applicable to aircraft bodies of standard forms without necessitating radical changes in the fuselage itself. Further, in view of the large strain imposed upon landing gears, both in take-off and in landing, it is vital that a structure having a maximum strength must be provided. In addition, the control system operative and retracted position, must be simple and positive and designed to afford a quick and easy operation of the parts.

Figure 4 is a phantom top plan showing auxiliary power means operable to start the main power means of a flying machine or to rotate the landing wheels thereof.

Figure 5 is a phantom side elevation of Figure 4.

Figure 6 is a phantom front elevation of Figure 4.

Figure 7 is an enlarged sectional elevation showing a form of mounting for a landing wheel.

Figure 8 is a sectional plan of the structure shown in Figure 7 with the container closure open.

Figure 1:
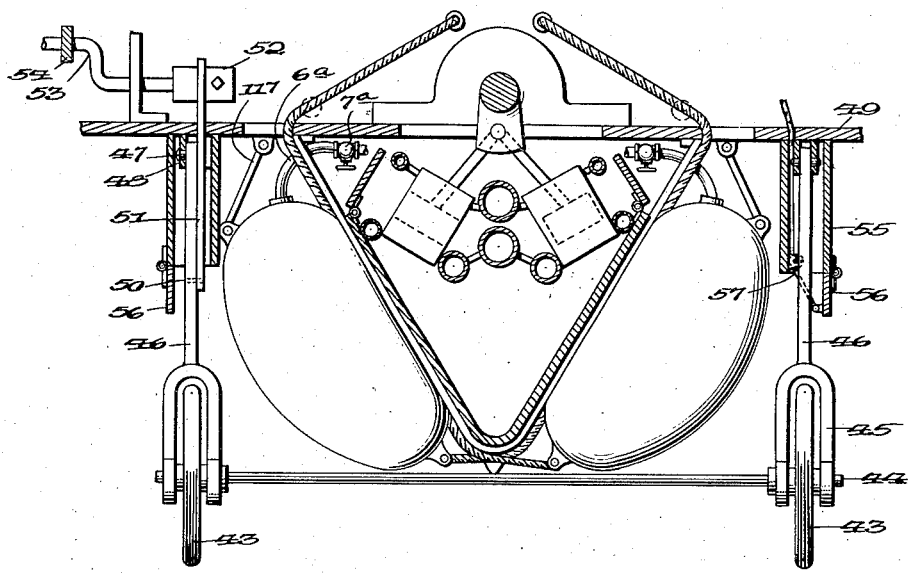
Figure 1 is a fragmentary vertical section through a flying machine embodying a launching and landing mechanism in accordance with this invention.
Figure 2:
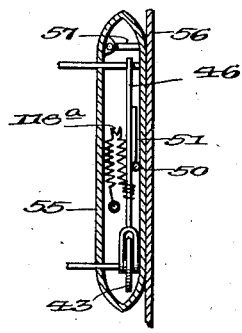
Figure 2 is a horizontal section through a landing wheel container as shown in Figure 1.

The extendable and retractable landing wheels 43 have a pivot or axle 44 held by a bearing 45 terminating in a support 46 that revolves on a bearing 47 secured to a lug 48 attached to framing of aircraft 49. The support 46 has a connection 50 to which is attached a retractable means 51 that is secured to drum 52 that is rotated by crank shaft 53 controlled by connecting rod 54. This arrangement affords means of drawing landing wheels 43 up within the streamline container 55 that has a cover 56 with a means 57 for closing the cover when landing wheels 43 are inclosed within streamline container 55. The support 46 may be provided with a flexible connection such as the spring 118 shown in Figure 2.

Figure 3:
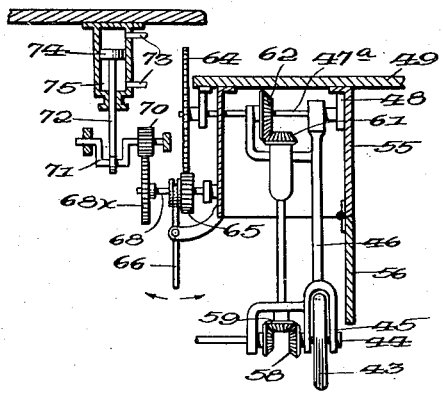
Figure 3 is a fragmentary vertical section showing a power operating means for rotating the landing wheels of a flying machine.

To wheels 43 may be attached a bevelled gear 58 meshed with another bevelled gear 59 connected with a shaft 60 having another bevelled gear 61 meshing with still another bevelled gear 62. Bevelled gear 62 is preferably concentric with the bearing 47a of wheel support 46 to allow landing wheel 43 to be inclosed in streamline container 55 without interfering with a train of gears above mentioned, the container being enlarged sufficiently to accommodate the gears as shown in Figure 3. Bearing 47a on which the bevelled gear 63 is secured also has secured a gear 64 meshing with a pinion 65 mounted on a shaft 68 and having a clutch arrangement 66 for engaging or disengaging pinion 65. At one end of shaft 68 is a gear 68x meshing with pinion 70 attached to crank shaft 71. The crank shaft may be operated in any suitable manner such as by connecting rod 72 and piston 74 in cylinder 75 having fluid operating connections 73, and which furnishes motive power for operating from the above chain of gears for the landing wheels 43 while taxying upon the highway or airport. This arrangement of power to wheels 43 may be used for steering and braking wheels 43.

A modification of shaft 68 is shown in Figure 4 and designated 68a, which is operated by an auxiliary engine 87. A gear 76 upon shaft 68a may be connected by clutch operating means 66a to engage gear 77 on shaft 78 having bevelled gears 79 meshing with bevelled gear 80 on shaft 81 with a gear 82 meshing with gear 83 on the main engine shaft 84 to which the propeller 85 is attached furnishing means for starting the main engine 86 by the small engine 87 before the take off or while in flight. A clutch arrangement 88 may be so arranged that the small engine 87 may be employed to start the main engine 86, or to operate the landing wheels 43.

In the embodiment shown in Figures 7 and 8, the landing wheel 43 is carried by a support 46a which is pivoted to a bracket 48b secured to the frame 49 and depending into the container 55a. Intermediate the ends of the support 46a is a lug 50a to which is pivotally connected a hollow strut 51a. Disposed within the strut 51a is a spring 118, the upper end of which is secured to a cap 119 for the strut 51a.

When the wheel 43 is in retracted position, the cover 56a for the container is secured in closed position by suitable operating means such as a cable 123. Upon releasing the cable, the cover is forced open by means of a spring 124, and the wheel 43 is permitted to fall by gravity to operative position. As the wheel 43 falls into operative position, carrying the strut 51a and cap 119 therewith, the latter rides over the bevelled upper face of a pawl 120 which is then forced into locking position with respect to the cap by means of a spring 121. When it is desired to retract the wheel 43, the pawl 120 may be released by means of a suitable cable 122 connected therewith.

When the cap 119 is locked by means of the pawl 120, the spring 118 provides a flexible connection for the support 46a. Preferably the wheel 43 will be provided with a stream lined brace 155 having a swivel connection 158 with its securing member 157.

Figure 9:
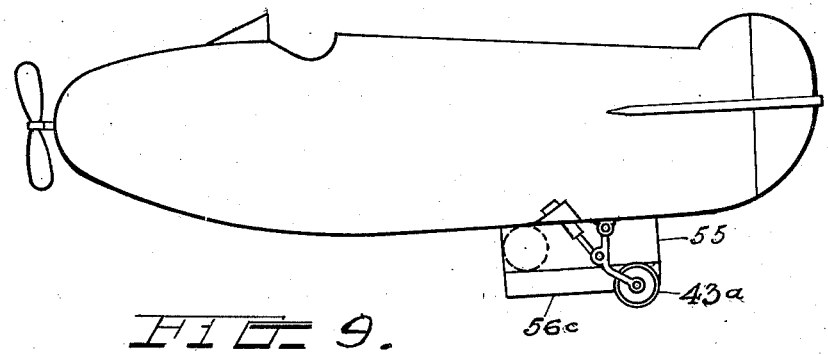
Figure 9 is a side elevation of a flying machine showing a rear landing wheel mechanism associated therewith.
Figure 10:
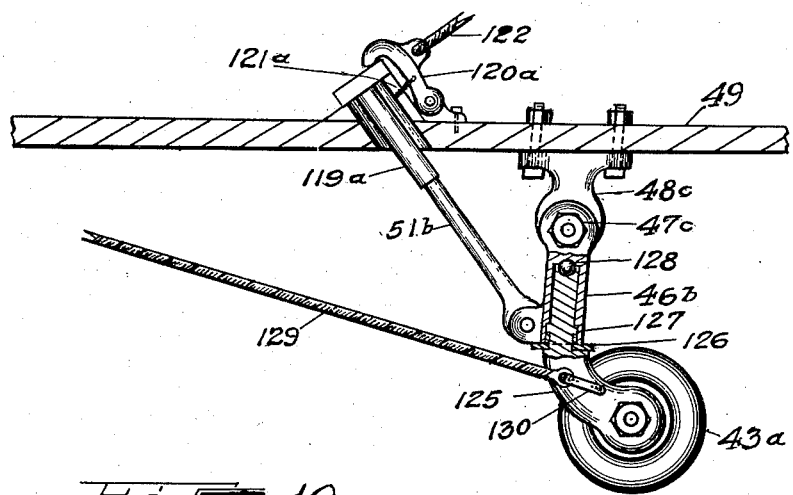
Figure 10 is an enlarged sectional elevation of the landing wheel mechanism shown in Figure 9.

The rear landing wheel 43a shown in Figures 9 and 10 is carried by a forked member 125 extending into a hollow support 46b pivoted at 47c with a bracket 48c secured to the frame 49. The member 125 is provided at its upper end with a ball bearing 128 to facilitate turning thereof, and is also provided with a flange 127 for engagement with a bushing 126 to prevent the member 125 from becoming separated from the support 46b.

The support 46b is provided with a flexible connection in the same manner as heretofore described for the support 46a, such connection comprising a hollow strut 51b having a cap 119a which is normally locked by a pawl 120a actuated by a spring 121a, and releasable when desired by means of a cable 122. After releasing the pawl 120a by means of the cable 122, the wheel 43a may be retracted by means of a cap 129 secured thereto.

The landing wheels 43 in stream line container 55 have a brace 155 attached to a connection 156 preferably at the hub of wheel 43 with a connection 157 that may have a swivel joint 158. This brace 155 should be stream lined in direction when wheel 43 is inclosed.

The joint of the landing wheels 43 is in a direction causing the fork 125 to rotate in a plane which is in the general direction of flight.

I have shown an apparatus embodying my invention in several general forms but do not wish to be understood as limiting myself strictly to the precise details of construction herein before described. I do not wish to be held to exact shapes or dimensions or to any particular combination of parts but wish to be free to use any part herein or described or covered by the class with any other parts or part whether shown herein or elsewhere.

Having thus described my invention, what I claim as new, and desire to secure by Letters Patent is:—

1. A retractable and extendable landing and take-off means for aircraft comprising, a streamlined container disposed lengthwise of and depending from the body of the aircraft, said container having an open bottom, a downwardly swinging door normally closing said open bottom, an elongated support disposed within the container and having one end pivotally mounted therein, said support being adapted to swing by gravity about its pivoted connection and being of a length to project below the container when so swung, a ground engaging wheel secured to the opposite end of the support, means connected with the support intermediate the ends of the latter for normally maintaining the support and wheel within the container and for returning them thereto, and power operated gearing within the container and mounted to swing about a pivot concentric to the pivotal mounting for the support for rotating said wheel.

2. A retractable and extendable landing and take-off means for aircraft comprising, a streamlined container disposed lengthwise of and depending from the body of the aircraft, said container having an open bottom, a downwardly swinging door normally closing said open bottom, an elongated support disposed within the container and having one end pivotally mounted therein, said support being adapted to swing by gravity about its pivotal connection and being of a length to project below the container when so swung, a ground engaging wheel secured to the opposite end of the support, and power operated gearing within the container and mounted to swing about a pivot concentric to the pivotal mounting for the support for rotating said wheel.

3. A retractable and extendable landing and take-off means for aircraft comprising, a streamlined container disposed lengthwise of and depending from the body of the aircraft, a support disposed within the container and having one end pivotally mounted therein, a ground engaging wheel mounted on the opposite end of the support, a tubular strut having its lower end pivoted to the support intermediate the ends of the latter and having its upper end projecting into the body of the aircraft, a cap member slidably mounted on the upper end of the tubular member, means for releasably latching the cap member against movement, and a shock absorbing spring disposed within the tubular member.

4. A retractable and extendable landing and take-off means for aircraft comprising a streamlined container disposed lengthwise of and depending from the body of the aircraft, a support disposed within the container and having one end pivotally mounted therein, a ground engaging wheel mounted on the opposite end of the support, a tubular strut having its lower end pivoted to the support intermediate the ends of the latter and having its upper end projecting into the body of the aircraft, a cap member slidably mounted on the upper end of the tubular member, means for releasably latching the cap member against movement, a shock absorbing spring disposed within the tubular member, and a swively mounted streamlined brace connected with said wheel.

5. A retractable and extendable landing and take-off means for aircraft comprising, a pivoted support for a landing device, a tubular strut pivoted to said support between its pivot and said landing device, a cap member slidably mounted on the upper end of the tubular strut, means for releasably latching the cap member against movement, and a shock absorbing spring disposed within said tubular strut.

6. A retractable and extendable landing and take-off means for aircraft comprising, a pivoted support for a landing device, a shock absorbing spring having one end connected with said support between its pivot and said landing device, an abutment for the other end of said spring, and spring pressed pawl means actuated by the extension of the landing device for latching said abutment against movement.

7. A retractable and extendable landing and take-off means for aircraft comprising, a pivoted support for a ground engaging wheel, means for swinging the support about its pivot, and power operated gearing mounted to swing about a pivot concentric to the pivot for said support for rotating said wheel.

HERBERT L. ADAMS.